July 21, 1925.  
J. B. TYTUS  
SKEW TABLE FOR ROLLING MILLS  
Filed May 1, 1923
1,546,520
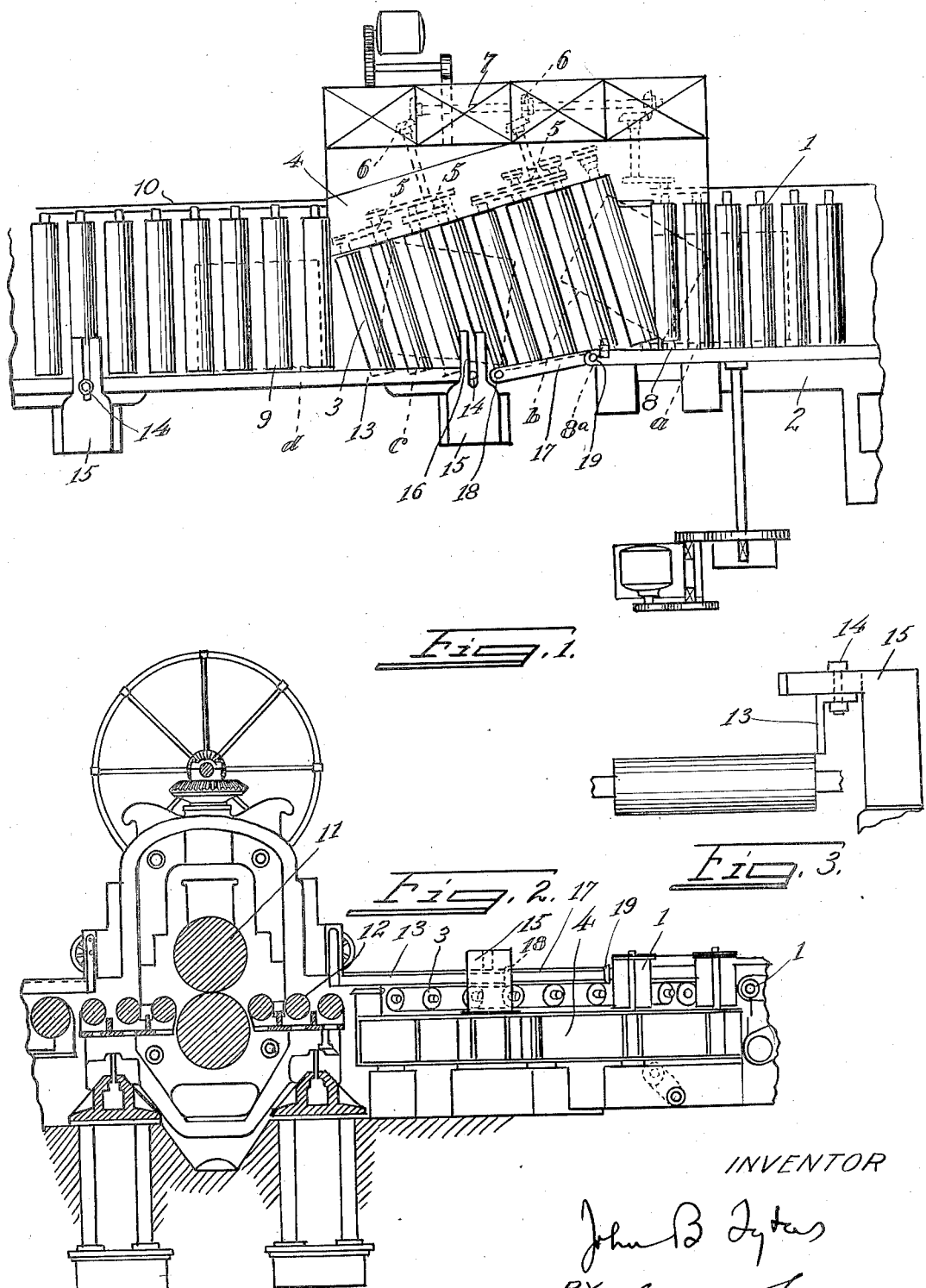

Patented July 21, 1925.

1,546,520

UNITED STATES PATENT OFFICE.

JOHN B. TYTUS, OF MIDDLETOWN, OHIO, ASSIGNOR TO THE AMERICAN ROLLING MILL COMPANY, OF MIDDLETOWN, OHIO, A CORPORATION OF OHIO.

SKEW TABLE FOR ROLLING MILLS.

Application filed May 1, 1923. Serial No. 635,986.

*To all whom it may concern:*

Be it known that I, JOHN B. TYTUS, a citizen of the United States, and a resident of Middletown, in the county of Butler and State of Ohio, have invented a certain new and useful Skew Table for Rolling Mills, of which the following is a full, clear, and exact description, reference being had to the accompanying drawing, forming part of this specification.

My invention relates to tables for use in rolling mills which will turn a piece at right angles, and deliver it in a truly aligned position to a stand of rolls, or another conveyor.

The usual table used for revolving a piece is formed so as to take a piece from a conveyor, and then revolve around as a body, and deliver the piece to another conveyor, or to a stand of rolls or the like. The operations involved include stopping and starting the table, lifting it out of the way of the receiving and delivering conveyors, revolving the table, and stopping and starting the pieces as they come toward the revolving table, so that during the revolving operation there is no material delivered.

My invention is directed to the employment of driven rolls, set askew, and stops, and side guards, so arranged as to cause a piece to turn of itself, and to move along on its predetermined path in the reversed position. Each turn imparted will be one quarter turn, but as many quarter turns as desired can be provided for.

Also my invention involves the adjustability of the device for different feed alignments, thereby accommodating different widths of pieces, where delivery to the rolls of a mill is desired.

I accomplish my various objects by that certain construction and arrangement of parts to be hereinafter more specifically pointed out and claimed.

In the drawings:

Figure 1 is a plan view of the device.

Figure 2 is a side elevation thereof, showing a stand of rolls to which the piece is fed.

Figure 3 is a detail of the guide rail or side stop mounting device.

I have shown as an example of my invention, and not as the sole intended embodiment thereof, a delivery conveyor formed of a set of driven rolls 1, mounted in a frame 2. The skew table has a series of rollers 3, set in a frame marked generally as 4. These rolls receive their drive from gears 5, which are driven from beveled gears 6, on a shaft 7. The shaft 7 is shown as driven by a motor, and the arrangement is such that all of the rolls 3 are driven in the same direction.

The rolls 3 are so set in their frame, that they are at an angle of 15 degrees (in the example shown), and located at a point preferably before the piece strikes the first receiving roller is a projecting stop 8, which strikes a piece as it comes onto the skew table. The exact location of the piece 8 is not essential.

In Figure 1, I have shown a like conveyor to the delivery conveyor, and having driven rolls 9, set in a frame 10, to act as a delivery table.

In Figure 2, I have shown a stand of mill rolls 11, with idler delivery rolls 12, forming part of the mill, as receiving the piece from the skew table.

I have shown the piece (Fig. 1) in dotted lines in four positions marked a, b, c, and d. In position a, the piece is moving along the table 1 before reaching the first angularly set roll, and its corner is coming into contact with the stop, said stop being located as noted.

However, the stop may be located over the first skewed roll, or made adjustable. This stop will cause the piece to turn to an angle say of about 45 degrees, as it will feed around the stop 8 to the position b.

A skewed roll tends to move the piece in a direction at right angles to the roll, and the result on the piece is that it is moved to the position c, since the corner strikes and drags on the side guide or stop, while the skewed rollers are trying to feed the piece toward the side of the skew table on which the guide is located.

I locate the guard rail along the side toward which the piece is driven, so that the piece will be lined up exactly with this guard and so delivered to the desired mechanism, and will not catch on the forward edge of the guard.

There is an advantage in certain work to locate the turning stop 8, at 8ª over the first few skewed rolls so that the table will force the piece over to the stop and avoid it passing by.

As a simple form of side guard, I have shown an angle bar 13, mounted by means of bolts 14, on a pair of brackets 15. These brackets have slots 16 therein so that the position of the side guard can be adjusted.

The piece moves to position $d$, by the action noted, with its entire edge dragging along on the side guard, and is thus lined up exactly with relation to the mechanism to which it is desired to make delivery.

Thus my table acts to take pieces successively and rapidly and without any more moving parts than an ordinary feed table, it will turn the piece at right angles, and line it up again.

If a wide piece is to be rolled, and its position of engagement by the rolls of a mill must accordingly be shifted, then the alignment of the piece is arranged by shifting the side guard.

Between the frame of the delivery table, and the adjustable mounting device for the side guard, I prefer to suspend an additional guard. In this instance I have shown a piece of angle iron 17, pivoted at 18 to the receiving end of the guard 13, and pivoted at 19 to the side guard of the delivery table. This is an optional arrangement, where use is made of a delivery table having a side guard thereon.

While I have shown in the drawing a metal sheet or plate, I do not wish to be limited by any precise form of piece. Also, it may be observed that two of the devices in line can accomplish a half revolution of the piece, or that other partial revolutions can be arranged for by setting the side guides.

Having thus described my invention, what I claim as new and desire to secure by Letters Patent, is:—

1. A feeding means for metal pieces or the like, comprising means for feeding a metal piece or the like, and for imparting a line of feed at an angle to that at which the piece is received, a stop located in the path of the piece so as to engage one corner thereof, while in engagement with said feeding means, thereby accomplishing a turning of the piece, and a side guard located beyond the stop along the angular feed means, and directed so as to engage the piece and enforce a sliding movement in the direction at which it was received, for the purpose described.

2. A feeding means for metal pieces or the like, comprising a series of rollers, and stops arranged and the rollers so driven as to cause a piece of metal engaged thereby to revolve one quarter turn in the plane of the feeding direction, and then proceed in substantially the same direction in which it was received.

3. A device for revolving metal pieces, while simultaneously feeding the same, comprising means tending to feed the piece at an angle to the path in which it is received, a stop to engage the piece at one corner in such a way as to oppose the feed at the new angle, and another stop subsequently engaging the piece and adapted to enforce a feed in a direction other than the said angle.

4. A device of the character described, comprising a series of driven rollers some of which at least are set at an angle to the path in which it is desired that a piece of metal shall move, and forming a table, and means extending along one side of said rollers, and adapted first to engage one corner of the piece, and subsequently to continuously obstruct a movement of the piece in the direction in which the rollers tend to feed it because of the angular placing thereof.

5. A device of the character described, comprising a series of driven rollers some of which at least are set at an angle to the path in which it is desired that a piece of metal shall move, and forming a table, and means extending along one side of said rollers, and adapted first to engage one corner of the piece, and subsequently to continuously obstruct a movement of the piece in the direction in which the rollers tend to feed it because of the angular placing thereof, said corner engaging means being located so as to project abruptly into the path of the piece as it is received upon the rollers.

6. A device of the character described comprising a series of driven rollers some of which at least are set at an angle to the path in which it is desired that a piece of metal shall move, and forming a table, and means extending along one side of said rollers, and adapted first to engage one corner of the piece, and subsequently to continuously obstruct a movement of the piece in the direction in which the rollers tend to feed it because of the angular placing thereof, said corner engaging means being located so as to project abruptly into the path of the piece as it is received upon the rollers, and the subsequent obstructing means adapted to extend entirely along the roller formed table, from its first point of engagement with the piece.

7. In combination a table formed of driven rollers some of which at least are set at an angle with relation to the line of feed desired, a guard along the angular rollers extending in the line of feed desired, and a projection over the table located toward the receiving end thereof from the guard and adapted to engage the corner of a metal piece that lies on the table.

8. In combination a table formed of driven rollers some of which at least are set at an angle with relation to the line of feed desired, a guard along the angular rollers extending in the line of feed desired, and a projection over the table located toward the receiving end thereof from the guard and adapted to engage the corner of a metal piece that lies on the table, said guard being adjustable in its position.

JOHN B. TYTUS.